United States Patent [19]
Kurimoto et al.

[11] Patent Number: 5,971,028
[45] Date of Patent: Oct. 26, 1999

[54] PROTECTING CAP FOR BANJO MEMBER USED IN BANJO TYPE JOINT

[75] Inventors: Kazunori Kurimoto, Konan; Shigeo Kimata, Komaki; Kota Kato, Nagoya; Takayuki Kimata, Komaki, all of Japan

[73] Assignee: Tokai Gomu Kogyo Kabushiki Kaisha, Komaki, Japan

[21] Appl. No.: 09/184,116

[22] Filed: Nov. 2, 1998

[30] Foreign Application Priority Data

Nov. 7, 1997 [JP] Japan ................................. 9-305406
Oct. 21, 1998 [JP] Japan ................................. 10-299533

[51] Int. Cl.$^6$ ................................................. F16L 57/00
[52] U.S. Cl. ............................................ 138/96 T; 138/89
[58] Field of Search ........................... 285/901; 138/89, 138/96 T

[56] References Cited

U.S. PATENT DOCUMENTS 5,403,041  4/1995  Merkel et al. .............................. 285/4

FOREIGN PATENT DOCUMENTS 0 446 098  9/1991  European Pat. Off. .
0 579 554  1/1994  European Pat. Off. .
2 370 893  6/1978  France .
6-32893   4/1994  Japan .

*Primary Examiner*—Andres Kashnikow
*Assistant Examiner*—Davis Hwu
*Attorney, Agent, or Firm*—Oblon, Spivak, McClelland, Maier & Neustadt, P.C.

[57] ABSTRACT

A protecting cap 10 for a Banjo member 42 used in a Banjo type joint 40 is an integrally molded product obtained from a resin material and extending from one end to an opposite end substantially in the same plane. A first cap portion 11 is provided at the one end and a second cap portion 21 is provided at the opposite end. The first cap portion is provided with a first annular flange portion 12 and a cylindrical female member 13 having a cylindrical wall 13a which is projected coaxially with the first annular flange portion from an inner peripheral portion. The second cap portion is provided with a second annular flange portion 22 and a projecting male member 23 projecting in parallel with the same direction as the cylindrical female member coaxially with the second annular flange portion. A connecting portion 31 extends between the first and second annular flange portions. The connecting portion 31 is provided with a deforming means for positioning the first and second cap portions opposedly to each other. The protecting cap further includes a retaining means which, when the projecting male member is inserted into the cylindrical wall of the cylindrical female member, prevents disengagement of the two until a disengaging operation is performed.

16 Claims, 12 Drawing Sheets

PROTECTING CAP FOR BANJO MEMBER USED IN BANJO TYPE JOINT

BACKGROUND OF THE INVENTION

The present invention relates to a protecting cap for a Banjo member used in a Banjo type joint. The protecting cap is suitable particularly for preventing damage of a pair of parallel sealing surfaces formed on a connecting sleeve of a Banjo type joint.

As shown in FIG. 15A, a Banjo type joint comprises a Banjo member 1 connected and fixed to one end of a metallic pipe 4, the Banjo member 1 having a cross hole 2c and a pair of parallel sealing surfaces 2d and 2e. In order for the Banjo member 1 to be easily connected and fixed to one end of the pipe 4, the Banjo member 1 is provided with a cylindrical base portion 1a orthogonal to the cross hole 2c which is formed in a connecting sleeve 2. Various connecting sleeves 2 slightly different in axial thickness are adopted.

Another example of a Banjo type joint is shown in FIG. 15B, in which a cross hole 2c formed in a pair of parallel sealing surfaces 2d and 2e of a connecting sleeve 2 has openings 2a1 and 2a2 of different diameters. Various such Banjo type joints are also adopted.

There also is adopted such a Banjo type joint as shown in FIG. 15C, in which a Banjo member 1 does not have a base portion and substantially a connecting sleeve 2 is connected and fixed to one end of a pipe 4.

The Banjo type joint is used for connecting a piping part such as a flexible hose firmly to a mating member. For example, it is used for connecting a fuel pump to a delivery pipe without leakage of fuel in an automobile. Generally, in an automobile manufacturer, the Banjo member 1 as an assembled product with a flexible hose such as rubber hose fitted beforehand in the opposite end (not shown) of the pipe 4 of the Banjo type joint is connected to a pipe such as a delivery pipe with a Banjo bolt having a head portion.

Such an assembled product is fabricated and connected to a pipe 4 in the following manner. In a hose manufacturer, a large number of Banjo members 1 and pipes 4 are manufactured each individually beforehand, then one ends of the pipes 4 are connected and fixed to the base portions 1a of the Banjo members 1 to once produce a large number of Banjo type joints. Thereafter, flexible hoses are firmly fixed respectively to the opposite ends of the pipes 4 with use of metallic joint pieces such as a sleeve. A plurality of the thus-assembled products are then gathered and packed into a case and thereafter the thus-encased plural assembled products are conveyed from the hose manufacturer to an automobile manufacturer, which in turn connects the assembled products to pipes such as delivery pipes in automobiles with use of Banjo bolts.

In the automobile manufacturer, one parallel sealing surface 2d and the other parallel sealing surface 2e parallel to each other of the connecting sleeve 2 in the Banjo member 1 of such a Banjo type joint are held in a liquid-tight manner between a smooth surface of the mating member and a head portion of the Banjo bolt. Therefore, the parallel sealing surfaces 2d and 2e are machined in an extremely smooth state.

For this reason, it has been desired to provide a protecting cap for protecting the parallel sealing surfaces 2d and 2e to prevent the parallel sealing surfaces 2d and 2e from being flawed not only during manufacture of the Banjo type joint after fabrication of the Banjo member 1 but also during handling and conveyance until connection of the assembled product to the mating member on the customer side.

Heretofore, as to the protecting cap of this type, a rubber hose has been used as a flexible hose to be connected and fixed to the opposite end of the pipe, and in compliance with a customer's request it is necessary to use an adhesive for connecting and fixing the hose and the pipe to each other which adhesive requires a heat treatment. Therefore, the protecting cap used has been required to possess heat resistance.

As conventional protecting caps are known rubbery protecting caps capable of having cylindrical portions of being fitted in cross hole openings of different diameters, the cylindrical portions having flanges capable of coming into surface contact with sealing surfaces of a connecting sleeve and also having outside diameters capable of being fitted in the cross hole openings of different diameters. However, in order to prevent such rubbery protecting caps from coming off the connecting sleeve, it has been necessary particularly for the cylindrical portions to match the cross hole openings of different diameters. Besides, in both material cost and machining cost, rubbery protecting caps have been more expensive than resinous protecting caps.

Further, since there are a variety of Banjo type joints slightly different in axial thickness and cross hole opening diameter, it is required to provide a variety of protecting caps accordingly. Consequently, the storage and management of protecting caps become troublesome and so does the replacement of protecting caps.

By the way, a resin hose has come to be adopted as the flexible hose connected and fixed to the opposite end of the pipe. In the case of a resin hose, it is not necessary to conduct a heat treatment for connecting and fixing the resin hose to the opposite end of the pipe. The object of hose requiring a heat treatment now shows a downward trend with spread of such a resin hose.

According to the conventional way of doing, the expensive rubbery protecting caps are used repeatedly before shipping, and at the time of shipping the rubbery protecting caps are replaced with less expensive, resinous protecting caps which are not resistant to heat and which are of the same shape as the rubbery protecting caps.

Further, a tube connector provided with a protecting cap is known from U.S. Pat. No. 5,403,041.

The tube connector disclosed in the U.S. patent is provided with a connecting sleeve of the Banjo type joint, which has a cross hole for receiving together therein two sealing gaskets and a Banjo bolt for fixing to a mating member and also has a pair of parallel sealing surfaces.

The gaskets are brought into surface contact respectively with the paired parallel sealing surfaces, then the Banjo bolt is passed through the cross hole and the gaskets of the connecting sleeve in the Banjo type joint, and the protecting cap is mounted, whereby a Banjo member is held grippingly between a flank at one end of a U-shaped clamp of the protecting cap and a protecting cover at the opposite end, through an extension located at an intermediate position, thereby holding the Banjo bolt and the gaskets so as not to become disengaged from the connecting sleeve.

According to the invention disclosed in the above U.S. patent, the assembling time in an automobile manufacturer can be shortened because the components are respectively manufactured in a division of labor. Besides, there is no fear of falling of such spare mounting units as gaskets and Banjo bolt until the connection of an assembled product to a mating member is completed and hence it is possible to prevent damage to the threads of the Banjo bolt and damage of the paired parallel sealing surfaces. Thus, there accrue various advantages.

In such a tube connector, however, by means of the protecting cap, the Banjo bolt is inserted and held into the cross hole of the connecting sleeve in the Banjo type joint, and the gaskets are mounted beforehand with the Banjo bolt adapted.

Therefore, such the protecting cap is required to have dimensions matching the thickness between the paired parallel sealing surfaces of the Banjo member used, and the length of the Banyo bolt used.

If such a protecting cap is adopted, the gaskets and Banjo bolts held by the protecting cap are bulky and obstructive when the Banjo type joint is manufactured and when a flexible hose is connected and fixed to the opposite end of the pipe in the Banjo type joint. This obstruction is conspicuous particularly during manufacture of the Banjo type joint by an automatic machine such as a robot and when connecting and fixing a flexible hose to the opposite end of the pipe.

The Banjo bolt is not needed at all if it is attached beforehand to the mating member.

In all of the conventional protecting caps, in order to prevent disengagement from the connecting sleeve, it has been necessary to take matching to the diameter of each cross hole opening in each Banjo member and to the thickness between a pair of parallel sealing surfaces of each Banjo member and the length of the Banjo bolt used.

On the other hand, there are a variety of Banjo type joints slightly different in axial thickness and in the diameter of each cross hole opening. For this reason, with respect to each of the foregoing conventional protecting caps, it is necessary to provide various protecting caps for each of Banjo members. Consequently, the storage and management of protecting caps are troublesome and so does the replacement of protecting caps.

SUMMARY OF THE INVENTION

The present invention intends to solve the above-mentioned problems and it is the first object of the invention to provide a protecting cap capable of being mounted firmly to a connecting sleeve of a Banjo member while protecting sealing surfaces of the connecting sleeve, difficult to be disengaged from the connecting sleeve, moreover capable of being used in common to a variety of Banjo members slightly different in the diameter of cross hole opening in the connecting sleeve, and permitting the provision of lesser kinds of protecting caps than before. Preferably it is the second object of the invention to provide an inexpensive protecting cap capable of being used in common to a variety of Banjo members slightly different in the thickness between a pair of parallel sealing surfaces of each Banjo member.

The protecting cap according to the present invention is for a Banjo member used in a Banjo type joint and it is an integrally molded product formed of a resin material such as, for example, polypropylene or polyethylene and extending from one end to the opposite end substantially in the same plane. At the one end is provided a first cap portion, while at the opposite end is provided a second cap portion.

The first cap portion is provided with a first annular flange portion and a cylindrical female member having a cylindrical wall projecting from an inner peripheral portion of the first annular flange portion coaxially with the same flange portion. On the other hand, the second cap portion has a second annular flange portion and a projecting male member projecting in substantially parallel with the same direction as the cylindrical female member coaxially with the second annular flange portion. Preferably, the surface of each flange portion is formed with a projecting annular seating face or edge for abutment with parallel sealing surfaces of a connecting sleeve.

The first and second annular flange portions lie substantially in the same plane, and a connecting portion extends between both such annular flange portions. The connecting portion is provided with a deforming means for disposing the first and second cap portions in an opposite relation to each other. As the deforming means there may be adopted a hinge of a small wall thickness. In the case of adopting the hinge, it is desirable to form a plurality of grooves in the connecting portion so as to extend across a central axis of the protecting cap. It is more desirable that grooves extending across the central axis of the protecting cap are formed in both ends of the connecting portion in close proximity to the first and second annular flange portions. Preferably, the connecting portion comprises a central part, a first connecting part extending between the central part and the first annular flange portion, and a second connecting part extending between the central part and the second annular flange portion, the first connecting part and the second connecting part being formed as hinges and the central part formed as a C-shaped clip. The whole of the connecting portion may be constituted deformably, and a central line of the first connecting part and that of the second connecting part may be spaced in parallel with a central line of the protecting cap. By the deforming means formed in the connecting portion, the first and second cap portions can be disposed oppositely to each other, the first annular flange portion can be brought into surface contact with the first annular parallel sealing surface formed on the connecting sleeve of the Banjo member, and the second annular flange portion can be brought into surface contact with the second annular parallel sealing surface formed on the connecting sleeve. At this time, the cylindrical female member having the foregoing cylindrical wall can be inserted from the first annular parallel sealing surface into a cross hole formed in the connecting sleeve of the Banjo member, and the projecting male member can be inserted from the second parallel sealing surface into the cross hole and also into the cylindrical wall of the cylindrical female member.

The protecting cap is further provided with a retaining means which, when the projecting male member is inserted into the cylindrical wall of the cylindrical female member, prevents disengagement of the projecting male member and cylindrical female member until a disengaging operation is performed.

The retaining means may be composed of a first retaining portion formed on an inner peripheral surface of the cylindrical female member and a second retaining portion formed at the end of the projecting male member for engagement with the first retaining portion.

The retaining means may be composed of a first retaining engagement projection formed on either the end of the projecting male member or the inner peripheral surface of the cylindrical wall of the cylindrical female member and a second retaining engagement projection formed on the other for removable engagement with the first retaining engagement projection. Further, the retaining means may be composed of the first retaining engagement projection formed on either the end of the projecting male member or the inner peripheral surface of the cylindrical wall of the cylindrical female member and a second retaining engagement groove or recess formed on the other for removable engagement with the first retaining engagement projection.

More preferably, the retaining means comprises a first retaining portion formed on either the end of the projecting male member or the inner peripheral surface of the cylindrical wall of the cylindrical female member and a second retaining portion formed on the other for removable engagement with the first retaining portion, one of the first and second retaining portions being provided axially spacedly in plural steps.

In the present invention constructed as above, the connecting portion is bent by the deforming means, thereby causing the first and second cap portions to become opposed to each other, the cylindrical female member projecting from the inside of the second annular flange portion is fitted into the cross hole formed in the ring-shaped connecting sleeve of the Banjo type joint, the projecting male member projecting from the inside of the first annular flange portion is inserted into a hole of the cylindrical female member, and the first retaining projection formed on either the inner peripheral surface of the cylindrical female member or the outer peripheral surface of the projecting male member is brought into engagement with one of plural second retaining projections provided spacedly on the other in the cross hole direction which one retaining projection matches the thickness between the paired parallel sealing surfaces of the connecting sleeve. As a result, the first and second annular flange portions are superimposed respectively on the parallel sealing surfaces of the connecting sleeve, and the first and second cap portions are relatively tightly mounted to the connecting sleeve of the Banjo member.

Thus, according to the present invention, not only the protecting cap is prevented from falling off the connecting sleeve, but also the function of protecting the annular parallel sealing surfaces of the connecting sleeve in the protecting cap is sure to be fulfilled. Moreover, since the first and second retaining projections are engaged with each other by inserting the cylindrical female member of the first annular flange portion into the cross hole of the connecting sleeve and by inserting the projecting male member of the first annular flange portion into the hole of the cylindrical female member from the opposite side, thereby allowing the first and second cap portions tobe heldby the connecting sleeve, it is not necessary for the outside diameter of the projecting male member and that of the cylindrical female member to completely match the cross hole of the connecting sleeve, and so the protecting cap is applicable also to a Banjo member provided with a connecting sleeve having a little larger cross hole diameter.

DETAILED DESCRIPTION OF THE PREFERRED EMBODIMENTS

The present invention will be described in detail hereinunder by way of the first and second embodiments thereof. The first embodiment will first be described with reference to FIGS. 1 to 11.

Figure 5:
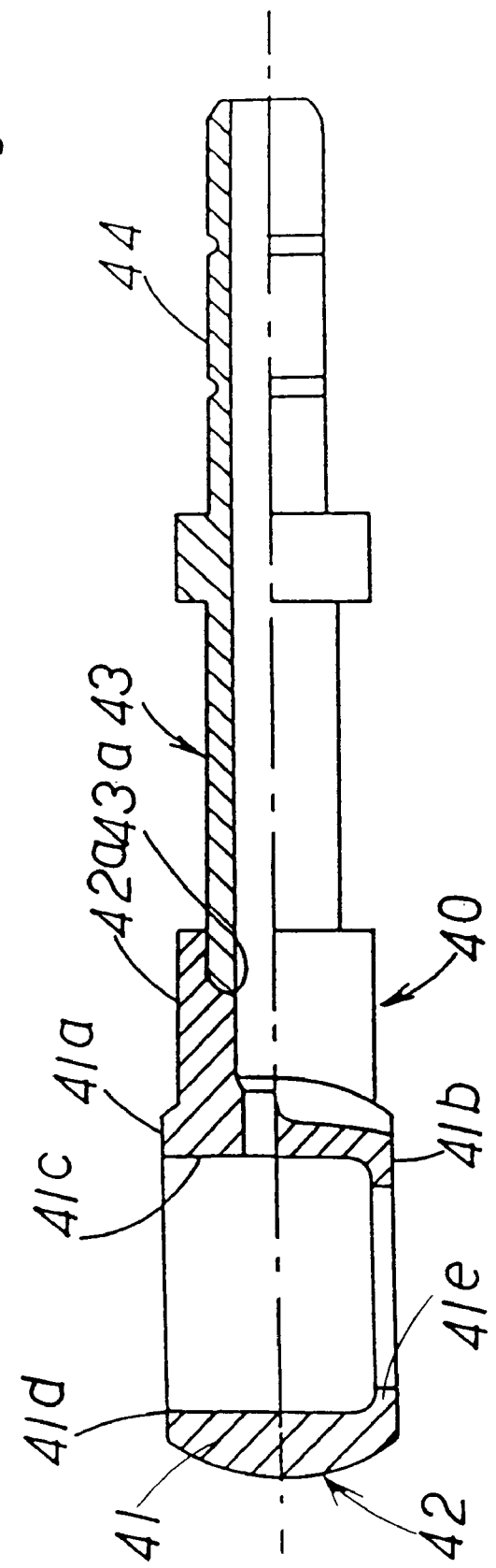
FIG. 5 is a partially sectional view of a Banjo type joint to which the protecting cap of the first embodiment is mounted.
Figure 6:
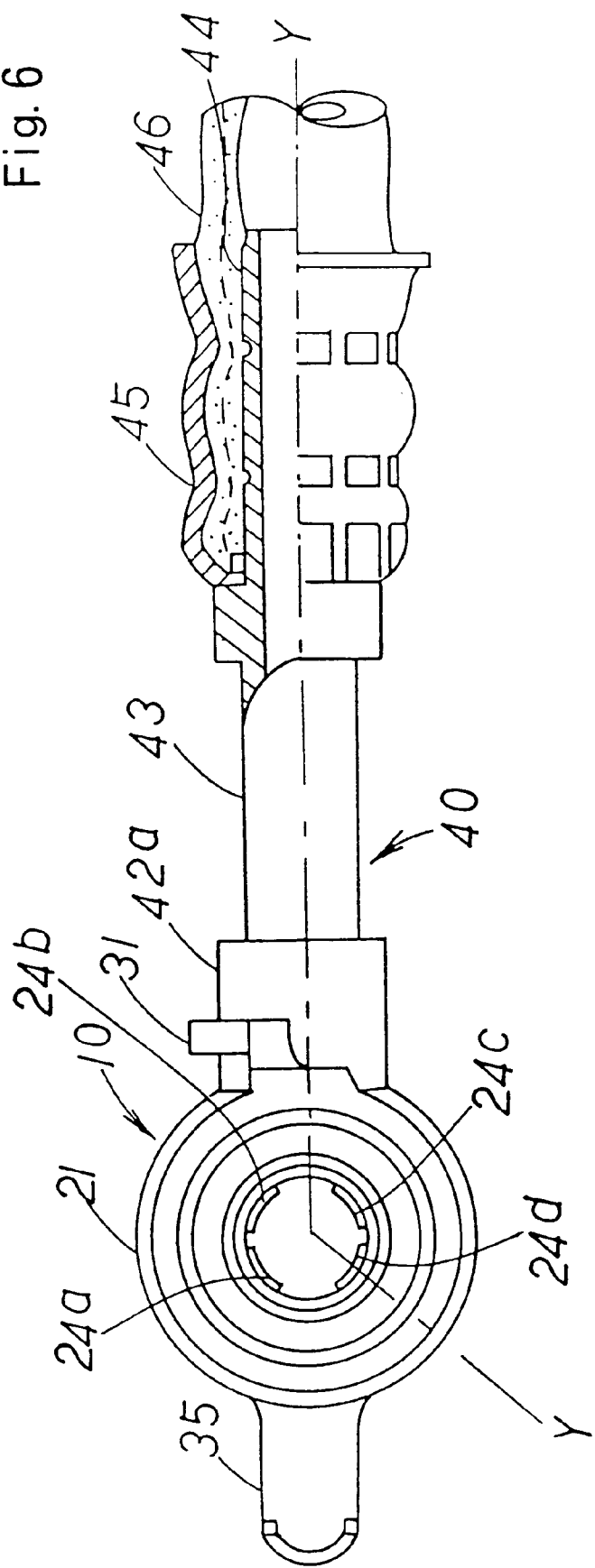
FIG. 6 is a partially sectional view showing a state in which the protecting cap has been mounted to a connecting sleeve of the Banjo type joint used in a hose which is provided with the same joint.
Figure 7:
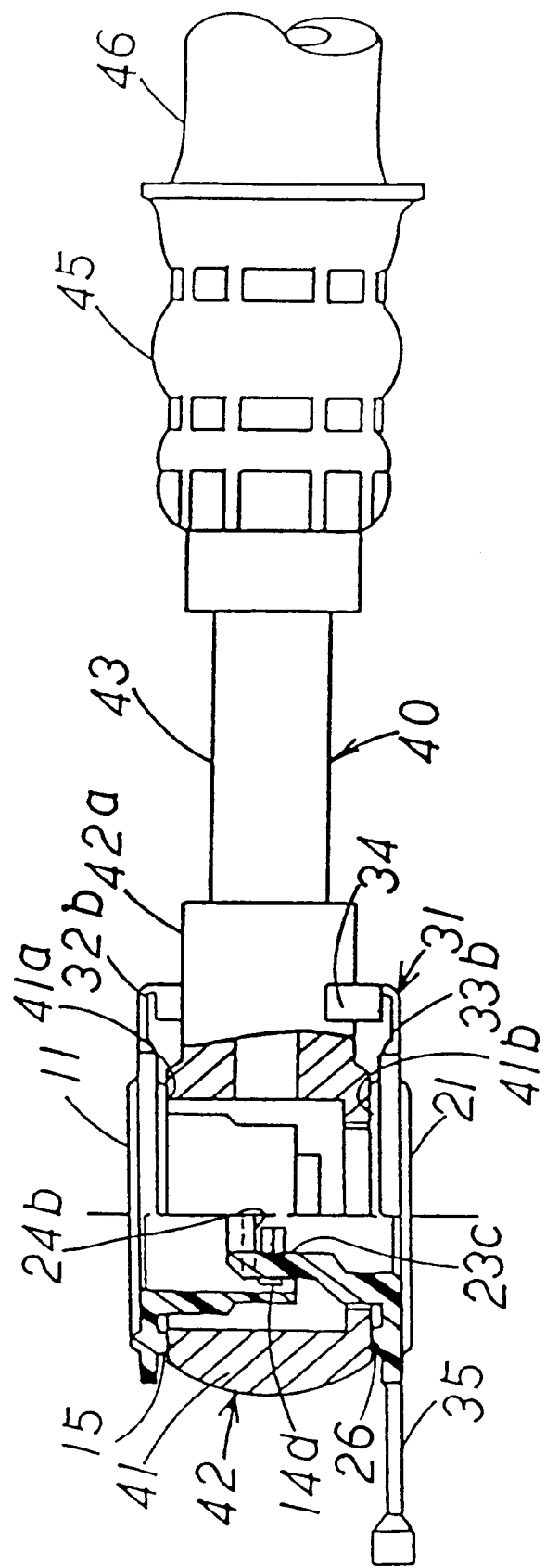
FIG. 7 is a front view showing a principal portion of FIG. 6 in section.

In FIG. 5, it is a Banjo type joint that is represented by the reference numeral 40. The Banjo type joint 40 comprises a cylindrical Banjo member 42 and a pipe-like joint member 43 connected to the Banjo member 42. Integral with the Banjo member 42 is a cylindrical base portion 42a which is for connecting one end 43a of the pipe or pipe-like joint member 43 to a cross hole 41c perpendicularly and which is projecting from the outer periphery of the Banjo member 42. One end 43a of the joint member 43 is fitted in a fitting hole of the cylindrical base portion 42a and is connected and fixed thereto integrally with the Banjo member 42 by soldering, while the opposite end of the joint member 43 is formed as a nipple portion 44 into which a flexible hose such as a rubber hose can be inserted. More specifically, as shown in FIGS. 6 and 7, a connecting sleeve 41, which constitutes the body of the Banjo member 42 of the Banjo type joint 40 and which has the cross hole 41c, is provided at both axial end potions of the cross hole 41c with a pair of first and second annular parallel sealing surfaces 41a, 41b which are parallel to each other and which extend in parallel with the pipe-like joint member 43. On the other hand, an end portion of a rubber hose 46 is inserted into the nipple portion 44 formed at the opposite end of the joint member 43 and a sleeve 45 fitted on the outer periphery of the nipple portion 44 is reduced its diameter by caulking, whereby the rubber hose 46 is firmly fixed to the nipple portion 44. Further, a protecting cap 10 is attached removably to the Banjo member 42 to prevent flaw of the first and second parallel sealing surfaces 41a, 41b formed on the connecting sleeve 41 of the Banjo member 42. The thus-assembled product is then delivered to an automobile manufacturer.

As shown in FIGS. 1 to 4, the protecting cap 10 is integrally formed substantially in the same plane by injection molding using a resin material such as polypropylene. Thus, it is an integrally molded product extending from one end to the opposite end.

To be more specific, at one end of the protecting cap 10 is formed a first cap portion 11 having a first circular annular flange portion 12 and at the opposite end thereof is formed a second cap portion 21 having a second circular annular flange portion 22 in the same plane as the first cap portion 11. Extending between the first and second annular flange portions 12, 22 is a connecting portion 31 which connects the first and second cap portions 11, 21 with each other. Outer diameters of the first and second annular flange portion 11,21 are approximately equal to an outer diameter of the connecting sleeve 41.

Figure 1:
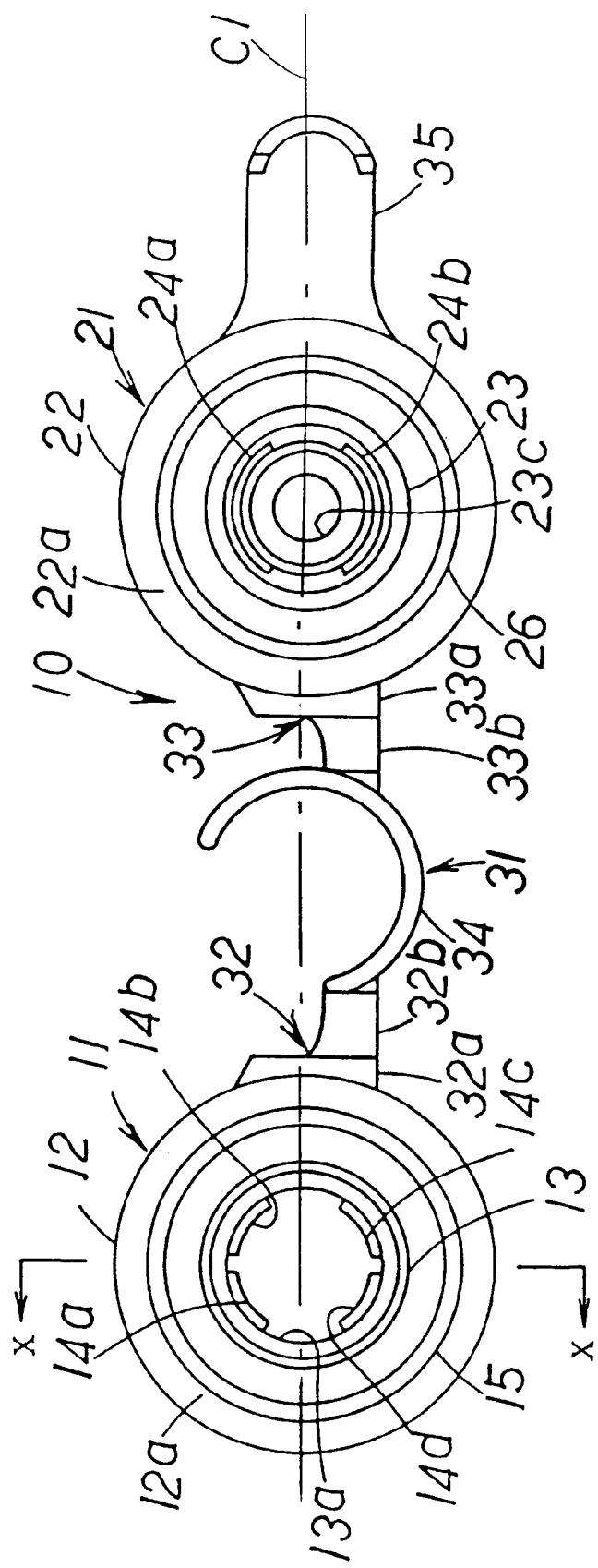
FIG. 1 is a plan view of a protecting cap according to the first embodiment of the present invention.
Figure 2:
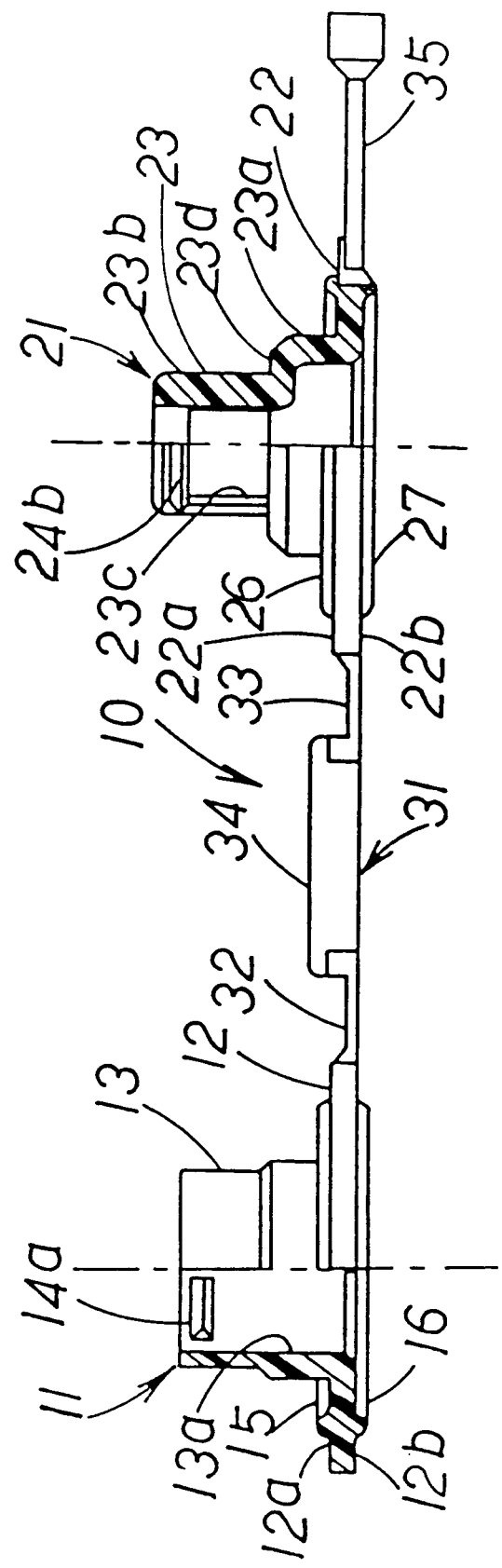
FIG. 2 is a front view showing principal portions of FIG. 1 in section.
Figure 3:
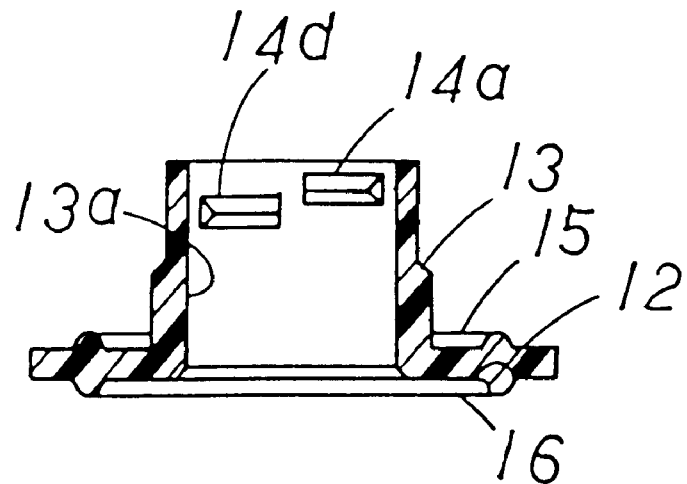
FIG. 3 is a sectional view taken along line X—X in FIG. 1.

As shown in FIGS. 1 and 2, the connecting portion 31 connects outer peripheral edges of the first and second annular flange portions 12, 22 with each other in the same plane, and it comprises a central part formed as a C-shaped clip 34, a first connecting part 32 extending between the central part 34 and the first annular flange portion 12, and a second connecting part 33 extending between the central part 34 and the second annular flange portion 22.

The first connecting part 32 and the second connecting part 33 are both substantially thin hinges 32b, 33b, whereby the first and second cap portions 11, 22 can be disposed opposedly to each other by those thin hinges 32b,33b.

A central line of the first connecting part 32 and that of the second connecting part 33 are spaced from and in parallel with a central line C1 of the protecting cap, so with the first and second cap portions 11, 22 connected together by the foregoing retaining means and even with an external force exerted on the connecting portion 31, it is possible to prevent disengagement of the retaining means effectively.

Figure 8:
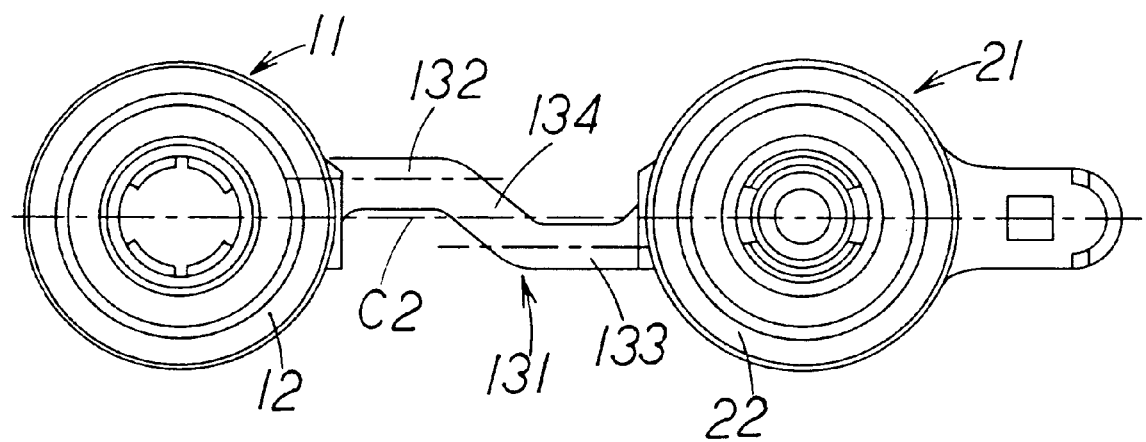
FIG. 8 is a plan view showing a modification of an engaging portion of a connecting portion.
Figure 9:
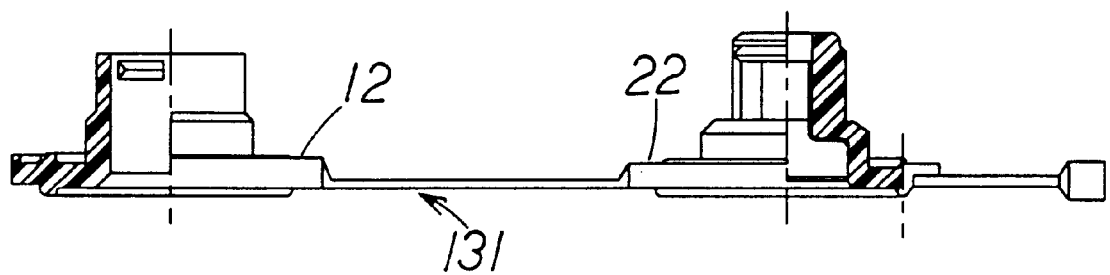
FIG. 9 is a front view showing apart of FIG. 8 in section.

Another form of a connecting portion capable of effectively preventing disengagement of the retaining means even with an external force exerted on the connecting portion 31 is shown in FIGS. 8 and 9. As shown in these figures, the connecting portion is formed in the shape of a thin plate having substantially the same width and capable of being deformed as a whole, and a central part 134 is formed obliquely. Further, between the central part 134 and the first annular flange portion 12 is formed a first connecting part 132 extending in parallel with the central line C1 of the protecting cap, and between the central part 134 and the second annular flange portion 22 is formed a second connecting part 133 extending in parallel with the central line C1 of the protecting cap, in such a manner that the central line of the first connecting part 132 and that of the second connecting part 133 are spaced in parallel with the central line C1 of the protecting cap.

Figure 10:
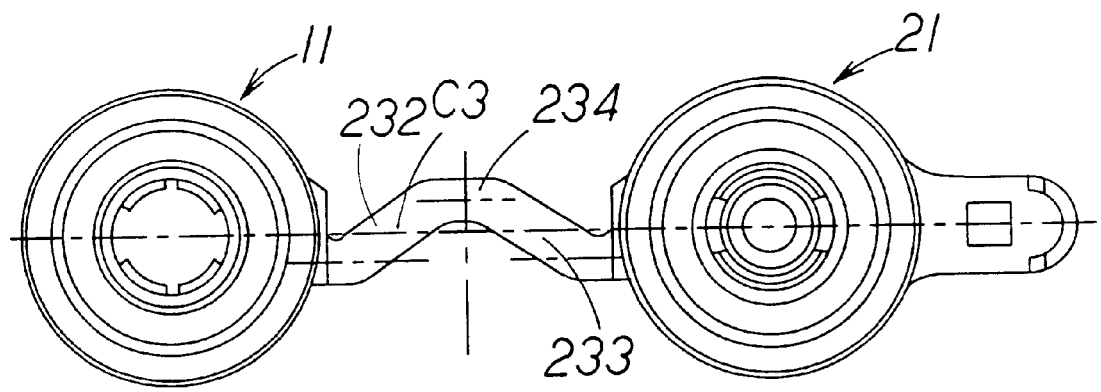
FIG. 10 is a plan view showing an engaging portion of a connecting portion according to another modification.
Figure 11:
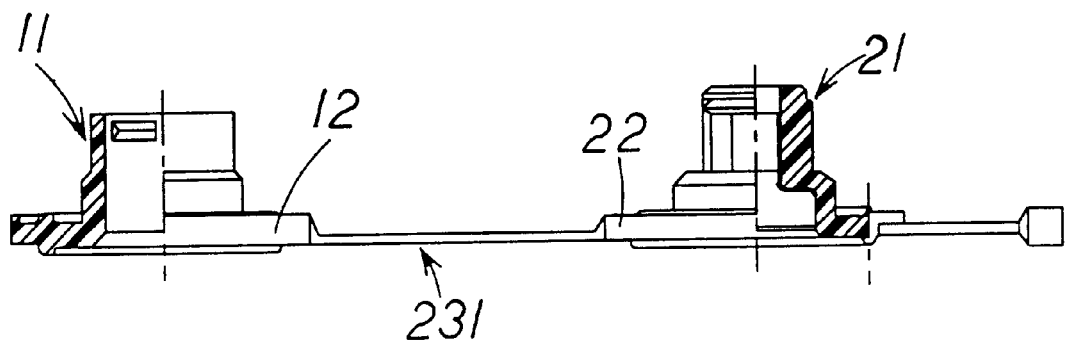
FIG. 11 is a front view showing a part of FIG. 10 in section.

In connection with the first embodiment, as shown in FIGS. 10 and 11, there may be formed a connecting portion 231 which connects outer peripheral edges of the first and second annular flange portions 12, 22 with each other in the same plane. More specifically, as shown in both figures, the connecting portion 231 is formed in the shape of a thin plate having substantially the same width and capable of being deformed as a whole, and a central part 234 thereof is formed in V shape. Further, between the central part 234 and the first annular flange portion 12 is formed a first connecting part 232 extending in parallel with the central line C1 of the protecting cap and between the central part 234 and the second annular flange portion 22 is formed a second connecting part 233 extending in parallel with the central line C1 of the protecting cap, in such a manner that a central line of the first connecting part 232 and that of the second connecting part 233 are spaced in parallel with the central line C1 of the protecting cap.

The C-shaped clip 34 can come into engagement with an outer peripheral surface of the cylindrical base portion 42a of the Banjo member 42 or with an outer peripheral surface of one end portion of the pipe. After the C-shaped clip 34 of the protecting cap 10 is brought into engagement with the outer periphery of the cylindrical base portion 42a of the Banjo member 42, the protecting cap can be bent at the connecting portion 31 so that the first and second capportions 11, 21 become opposed to each other. Therefore, in the protecting cap 10 which has thus been mounted through the C-shaped clip 34, the first annular flange portion 12 of the first cap portion 11 and the second annular flange portion 22 of the second cap portion 21 are prevented from rotating relative to the connecting sleeve 41 of the Banjo member 42.

The first cap portion 11 is provided with the first annular flange portion 12 and a cylindrical female member 13 having a cylindrical wall 13a which projects from an inner peripheral portion of the first annular flange portion 12 coaxially with the flange portion 12.

The second cap portion 21 is provided with the second annular flange portion 22 and a projecting male member 23 projecting in parallel with the same direction as the cylindrical female member 13 coaxially with the second annular flange portion 22.

Therefore, when thin hinges 32b and 33b are bent, allowing the first and second cap portions 11, 21 to be opposed to each other as shown in FIGS. 6 and 7, the first annular flange portion 12 can be brought into surface contact with the first annular parallel sealing surface 41a formed on the connecting sleeve 41 of the Banjo member 42 and at the same time the second annular flange portion 41b can be brought into surface contact with the second annular parallel sealing surface 41b formed on the connecting sleeve 41 of the Banjo member 42. At this time, moreover, the cylindrical female member 13 having the cylindrical wall 13a can be inserted into the cross hole 41c formed in the Banjo member 42, and the projecting male member 23 can be inserted from the second parallel sealing surface 41b side into the cross hole 41c formed in the Banjo member 42 and also into the cylindrical wall 13a of the cylindrical female member 13.

Thus, the protecting cap 10 can be bent at the connecting portion 31. Consequently, as shown in FIGS. 6 and 7, the cylindrical female member 13 and projecting male member 23 can be disposed opposedly to each other, the cylindrical female member 13 can be inserted from the first parallel sealing surface 41a side into the cross hole 41c, and the projecting male member 23 can be inserted from the second parallel sealing surface 41b side into the cross hole 41c. More specifically, an annular seating face 15 formed projectingly on the surface of the first annular flange portion 12 can be brought into surface contact with the first sealing surface 41a, while an annular seating face 26 formed projectingly on the surface of the second annular flange portion 22 can be brought into surface contact with the second sealing surface 41b. Further, the projecting male member 23 can be inserted relatively into the cylindrical wall 13a of the cylindrical female member 13.

By the provision of the annular seating faces 15 and 26, the sealability between the protecting cap 10 and the paired sealing surfaces 41a and 41b can be enhanced, and by using such the protecting cap 10 it is possible to easily conduct an air-tight test before shipping for the flexible hose equipped with the Banjo type joint.

On the cylindrical wall 13a of the cylindrical female member 13 are formed four, first engagement projections 14a, 14b, 14c and 14d of a triangular section slightly projecting toward the center, the four arcuate engagement projections extending circumferentially from one end to an opposite end. Concretely two steps engagement projections are formed substantially on the inner peripheral surface of the cylindrical wall 13a in an axially spaced manner ,one of which comprises two arcuate engagement projections 14a and 14c extending spacedly in the circumferential direction in the region of a free end of the cylindrical wall 13a, the engagement projections 14a and 14c being located at symmetric positions with respect to the diameter. The other retaining engagement projection comprises engagement projections 14b and 14d spaced a small distance from and axially inwards of the engagement projections 14a and 14c, the engagement projections 14b and 14d being located at a phase difference of 45° relative to the engagement projections 14a and 14c of the first step engagement projection.

On the other hand, the projecting male member 23 has a cylindrical base portion 23a adjacent to an inner peripheral portion of the second annular flange portion 22 and a ring-like end 23b formed at the end of a pair of leg portions 23c, 23c projecting from a surface 23d of the base portion 23a. The base portion 23a is inserted into one opening 41d through a clearance, and the ring-like end 23b can be inserted into the cylindrical wall 13a of the cylindrical female member 13.

Figure 4:
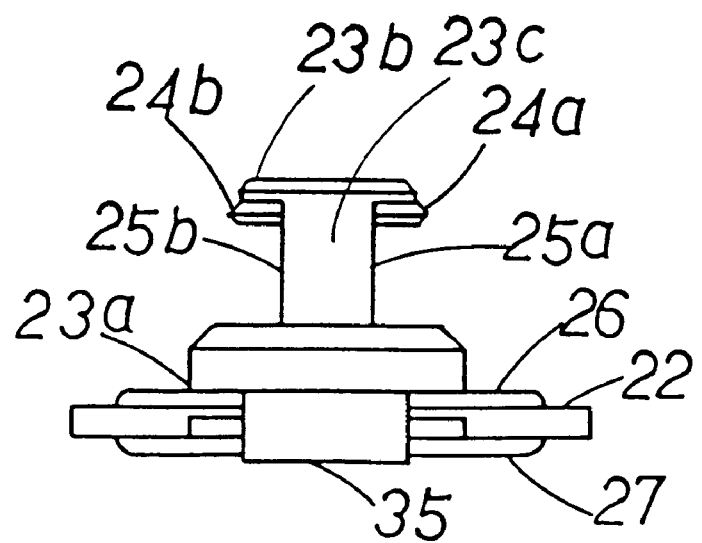
FIG. 4 is a right side view of FIG. 2.

On the outer periphery of the ring-like end 23b of the projecting male member 23, as shown in FIG. 1 and FIG. 4, are formed a pair of second engagement projections 24a and 24b of a triangular section, the engagement projections 24a and 24b projecting arcuately at a position in the region of the tip of the ring-like end 23b and symmetrically with respect to the central line C1 of the protecting cap from both circumferential ends 25a and 25b of the paired leg portions 23c, 23c which are substantially flat. The second engagement projections 24a and 24b can be deformed elastically by the pared leg portions 23c, 23c. When the projecting male member 23 is inserted relatively into the cylindrical wall 13a of the cylindrical female member 13, the engagement projections 24a,24b can be engaged with either the engagement projections 14a, 14c or the engagement projections 14b, 14d formed in the cylindrical wall 13a of the cylindrical female member 13. The engagement is not released until the first and second cap portions 11, 21 are substantially operated for disengagement. The disengagement of the first and second cap portions 11, 21 is operated by pulling up at least one flange portion 12 ,22 toward outer direction obliquely against the C-shaped clip 34.

The second engagement projections 24a and 24b for engagement with the first engagement projections 14a and 14c constitute a retaining means to be used for a certain type of a Banjo member having the thickness between a pair of parallel sealing surfaces, while the second engagement projections 24a and 24b for engagement with the other first engagement projections 14b and 14d constitute a retaining means to be used for the other type of a Banjo member having the thickness between a pair of parallel sealing surfaces.

Preferably, in order to facilitate disengagement of such a retaining means, there is provided an operating portion 35 extending outwards from the outer periphery of the second annular flange portion 22 of the second cap portion 21, whereby the second cap portion 21 is displaced to the outer direction obliquely with respect to the C-shaped clip 34 by the operating portion 35, so that the retaining means can be removed easily.

The following description is now provided about mounting the protecting cap 10 to the Banjo type joint 40.

The connecting portion 31 is bent with the hinges 32b and 33b as a boundary, allowing the first and second cap portions 11, 21 to be opposed to each other. Then, the projecting male member 23 projecting from the inside of the second annular flange portion 22 is inserted into the cross hole 41c from one end side of the Banjo member 42, while the cylindrical female member 13 projecting from the inside of the first annular flange portion 12 is inserted into the cross hole 41c from the opposite end side of the Banjo member 42. Further, the edge portion 23b of the projecting male member 23 is inserted into the cylindrical wall 13a of the cylindrical female member 13, so that the second engagement projections 24a and 24b formed at the end of the edge portion 23b come into engagement with either the first engagement projections 14a and 14c, or 14b and 14d, formed in the cylindrical wall 13a, whereby the first and second cap portions 11, 21 are kept fastened to each other until intentional disengagement from each other. In this way the protecting cap 10 is mounted to the Banjo member 42 in a compact and positive manner.

Next, in the protecting cap 10 thus mounted, the first annular flange portion 12 of the first cap portion 11 and the second annular flange portion 22 of the second cap portion 21 are rotated with respect to the connecting sleeve 41 of the Banjo member 42, allowing the engaging portion 34 formed as a C-shaped clip centrally of the connecting portion 31 to be engaged disengageably with the outer peripheral portion of the cylindrical base portion 42a projecting from the outer periphery of the Banjo member 42, whereby the protecting cap 10 is prevented from rotating circumferentially about the cross hole 41c of the connecting sleeve 41 in the Banjo member 42. Further, the operating portion 35 projecting outwards from the outer periphery of the second annular flange portion 22 can be located at a predetermined projecting position not overlapping the extending direction of the pipe 43. Therefore, an automatic assembly of the Banjo type joint 40 and the flexible hose can be done easily using an automatic machine.

There may be adopted a procedure such that the C-shaped clip 34 of the protecting cap 10 is brought into engagement beforehand with the cylindrical base portion 42a of the Banjo member 42 and then the connecting portion 31 is bent at the thin hinges 32b,33b so that the first and second cap portions 11, 21 become opposed to each other, thereby allowing the protecting cap 10 to be mounted to the connecting sleeve 41 of the Banjo member 42.

As set forth above, not only the mounting of the protecting cap 10 to the Banjo member 42 is easy, but also dislodgment of the protecting cap 10 from the Banjo type joint 40 can be surely prevented by engagement of the second engagement projections 24a and 24b with the first engagement projections 14a and 14c, or 14b and 14d. Thus, the function of protecting the annular parallel sealing surfaces 41a and 41b in the Banjo member 42 of the protecting cap 10 is ensured.

According to the present invention, the cylindrical female member 13 is inserted into the cross hole 41c of the connecting sleeve 41 and the projecting male member 23 is inserted into the cylindrical wall 13a of the cylindrical female member 13 from the axially opposite side, allowing the first engagement projections 14a and 14c, or 14b and 14d, to come into engagement with the second engagement projections 24a and 24b, whereby the first and second cap portions 11,21 are fastened to the connecting sleeve 41. Therefore, even if the fitting outside diameters of the projecting male member 23 and the cylindrical female member 13 are set loosely with respect to the diameters of the openings 41d and 41e of the cross hole 41c of the connecting sleeve 41, it is possible to completely prevent the protecting cap 10 from falling off the connecting sleeve 41. Besides, the function of the protecting cap 10 to protect the annular parallel sealing surfaces 41a and 41b of the connecting sleeve 41 is sure to be fulfilled.

That is, in the protecting cap 10 according to the present invention, it is not necessary that the outside diameters of the projecting male member 23 and the cylindrical female member 13 match completely the openings 41d and 41e diameters of the cross hole 41c formed in the connecting sleeve 41. The protecting cap 10 is applicable also to a Banjo member having a connecting sleeve 41 of somewhat different diameters of cross hole openings. Thus, it has become possible to use the protecting cap 10 in common to various Banjo members.

Preferably, when the first engagement projections formed on either the outer peripheral portion of the projecting male member 23 or the inner peripheral sur face of the cylindrical wall 13a of the cylindrical female member 13 are brought into engagement with the second engagement projections 24a and 24b formed on the other, either the former or the latter retaining portion is provided plurally steps in an axially spaced manner like 14a, 14c and 14b, 14d. In this case, the other engagement projections 24a and 24b can be engaged with the two steps engagement projections 14a,14c and 14b,14d. Thus, with one type of the protecting cap 10, it is possible to cope with a variety of Banjo members somewhat different in the diameters of openings 41d and 41e of the connecting sleeve 41 and in the thickness between the paired parallel sealing surfaces 41a and 41b. Thus, the storage and management of the protecting cap become less troublesome and the protecting cap replacement work is easy. Accordingly, the total cost required for the protecting cap can be reduced.

Figure 12:
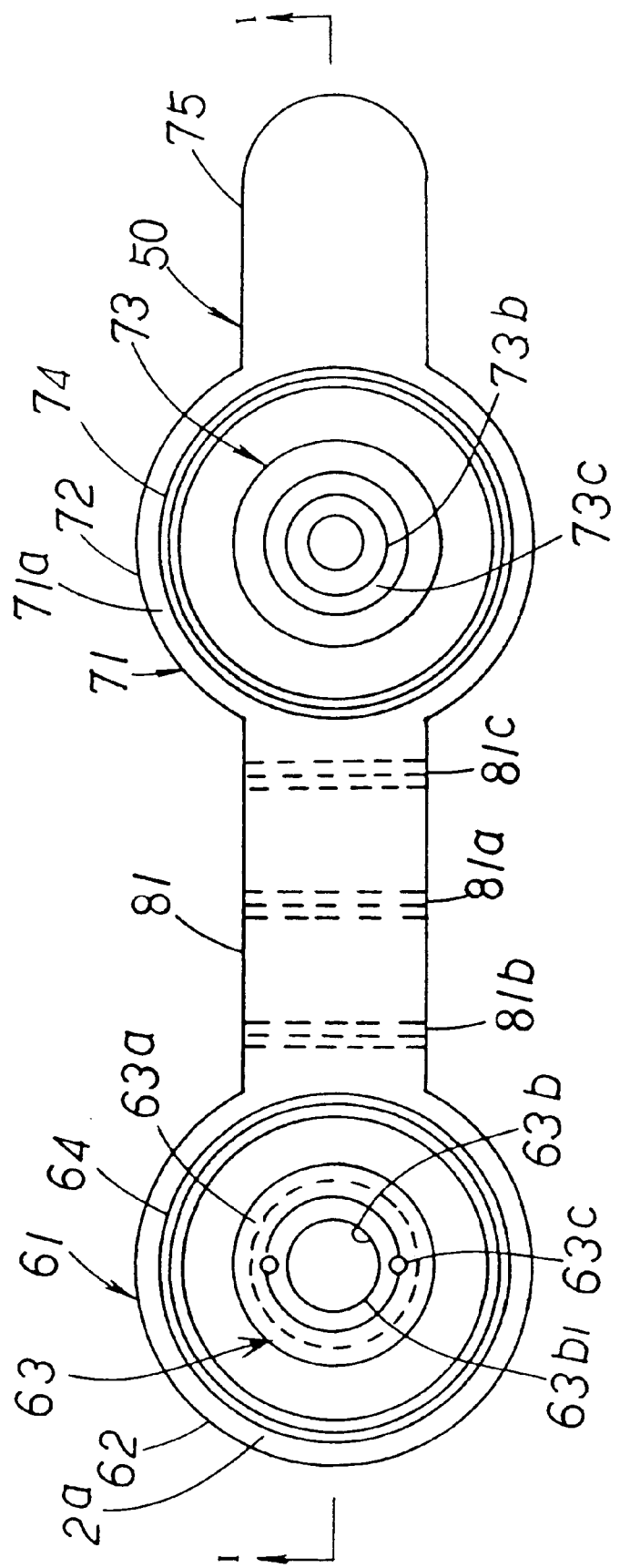
FIG. 12 is a plan view of a protecting cap according to the second embodiment of the present invention.
Figure 13:
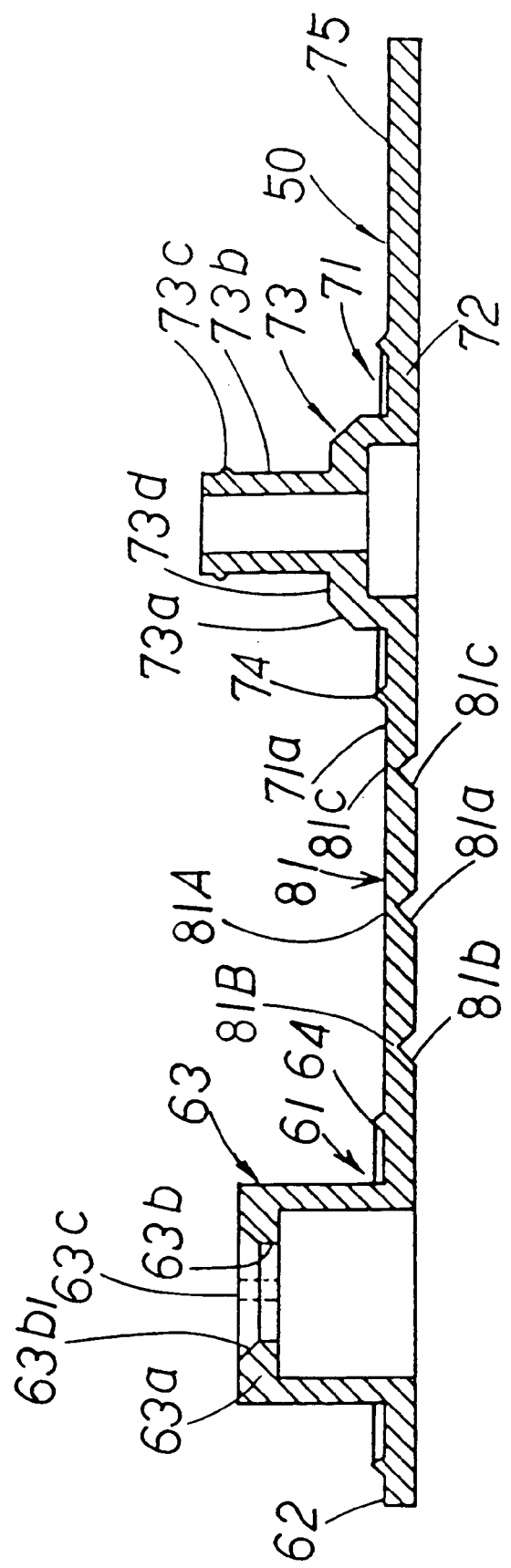
FIG. 13 is a plan view showing principal portions of FIG. 12 in section.
Figure 14:
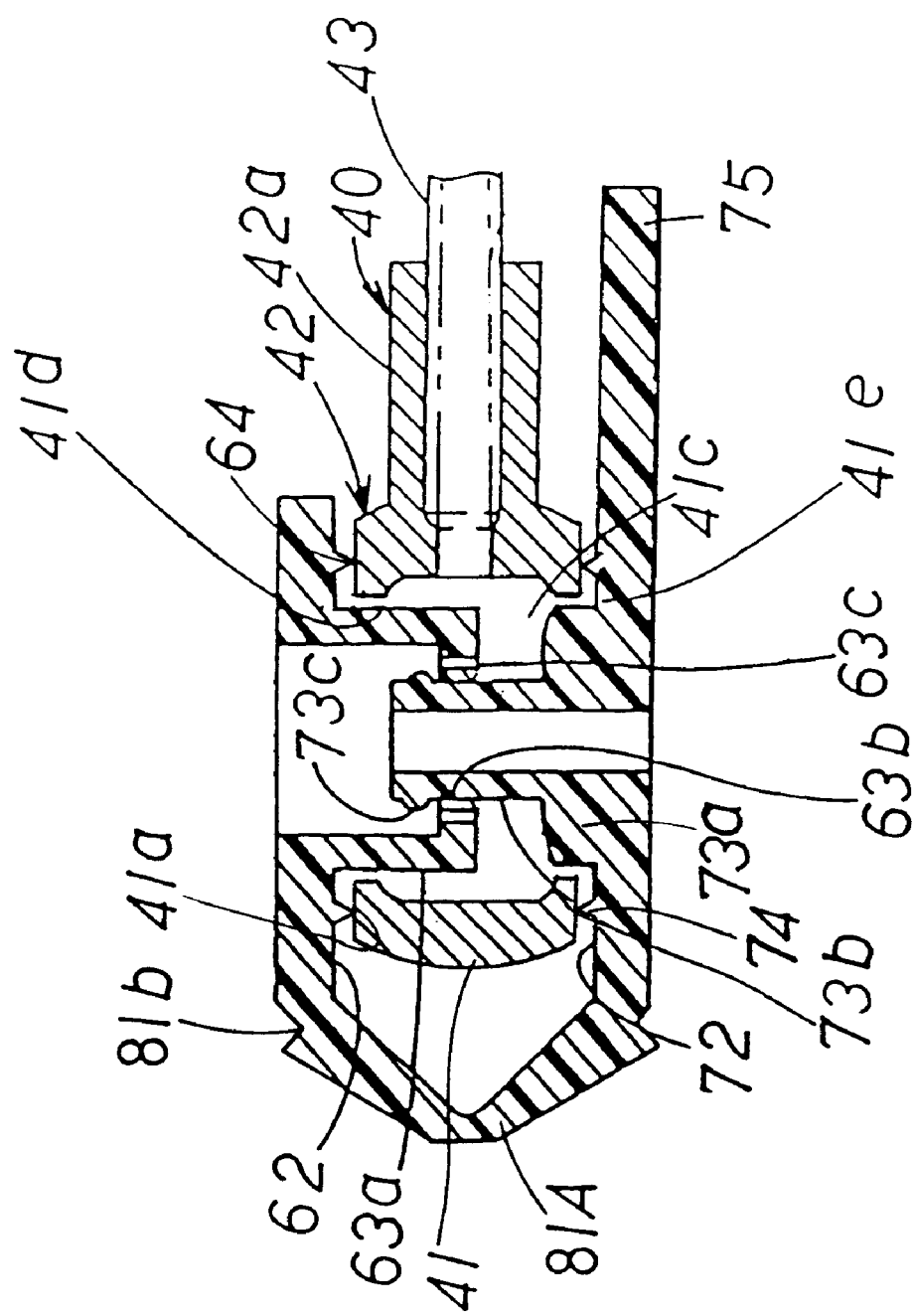
FIG. 14 is a sectional view showing a state in which the protecting cap of the second embodiment has been mounted to the connecting sleeve of the Banjo type joint.
Figure 15A:
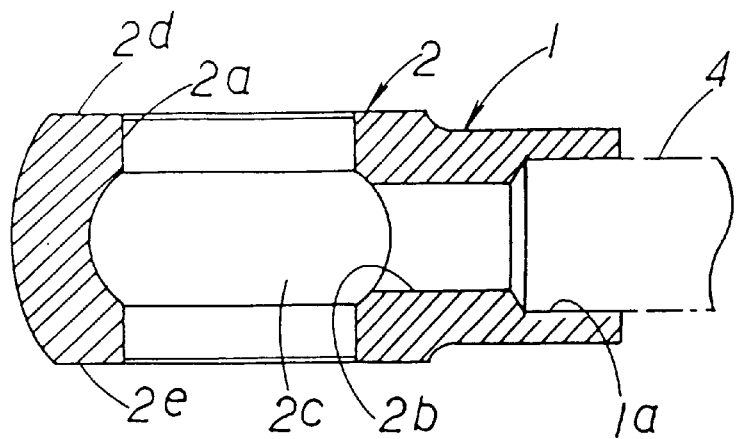
FIG. 15A is a sectional view of principal portions, explaining a Banjo type joint.
Figure 15B:
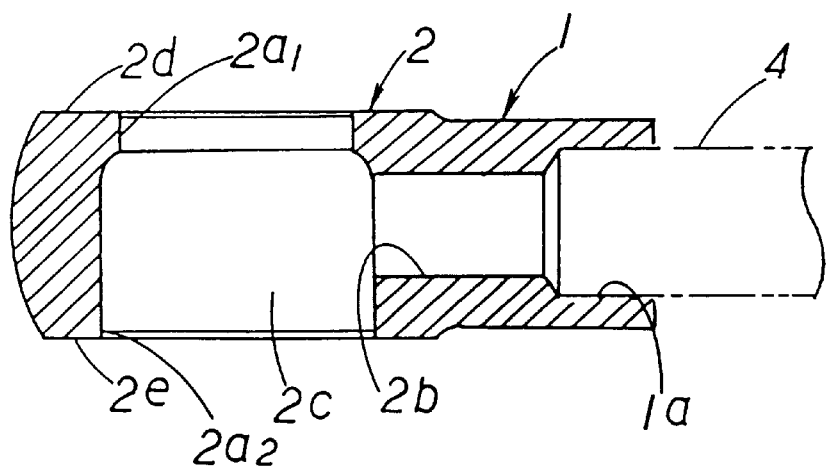
FIG. 15B is a sectional view of principal portions, explaining another type of a Banjo type joint.
Figure 15C:
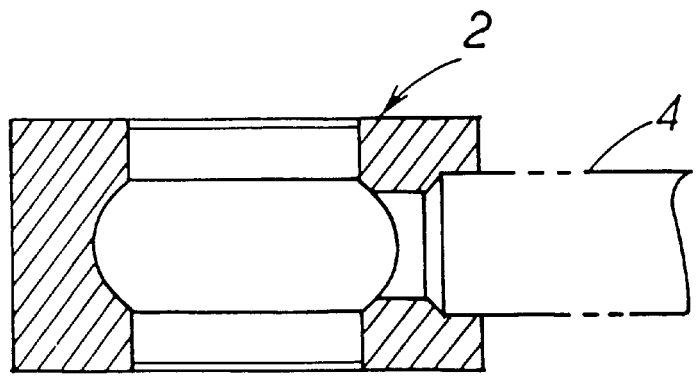
FIG. 15C is a sectional view of principal portions, explaining a Banjo type joint not having a base portion.

Next, the second embodiment of the present invention will be described with reference to FIGS. 12 to 14. In these figures, the numeral 50 denotes a protecting cap which, like that in the first embodiment, is also an integrally molded product using a resin material and extending from one end to an opposite end substantially in the same plane. Substantially, a first cap portion 61 is formed at one end and a second cap portion 71 at the opposite end.

The first cap portion 61 is provided with a first annular flange portion 62 and a cylindrical female member 63 having a cylindrical wall 63a which projects from an inner peripheral portion of the first annular flange portion 62 coaxially with the same flange portion 62.

On the other hand, the second cap portion 71 is provided with a second annular flange portion 72 and a cylindrical, projecting male member 73 projecting coaxially with the second annular flange portion 72 in parallel with the same direction as the projecting direction of the cylindrical female member 63.

A plate-like connecting portion 81 having a predetermined width extends between the first annular flange portion 62 provided at one end and the second annular flange portion 72 provided at the opposite end in the same plane as the first annular flange portion 62. The connecting portion 81 is provided with V-shaped grooves 81a, 81b and 81c as a deforming means, allowing the first and second cap portions 61,71 to be disposed in an opposed relation to each other. In the surface of the connecting portion 81 on the side opposite to the projecting side of the cylindrical female member 63 there are formed V-shaped grooves 81a, 81b and 81c perpendicularly to a central line of the protecting cap in a central position and in both side positions spaced from the central position and close to the outer periphery of the first annular flange portion 62 and that of the second annular flange portion 72.

The protecting cap according to the present invention, which is for a Banjo member used in a Banjo type joint, is provided with a first cap portion at one end thereof and a second cap portion at the opposite end.

Therefore, the V-shaped grooves 81a, 81b and 81c formed in the connecting portion 81 act as hinges, permitting the first and second cap portions 61 and 71 to be disposed in an opposed relation to each other. As shown in FIG. 14, the first annular flange portion 62 can be brought into surface contact with the first parallel sealing surface 41a formed on the connecting sleeve 41 of the Banjo member 42, and the second annular flange portion 72 can be brought into surface contact with the second parallel sealing surface 41b of the connecting sleeve 41. In this case, the cylindrical female member 63 having the cylindrical wall 63a can be inserted from the first parallel sealing surface 41a side into the cross hole 41c formed in the connecting sleeve 41 of the Banjo member 42, and the projecting male member 73 can be inserted from the second parallel sealing surface 41b side into the cross hole 41c and also into the cylindrical wall 63a of the cylindrical female member 63.

In order that the protecting cap can be used also in an air-tight test, annular projecting edges 64 and 74 for abutment with the first and second annular parallel sealing surfaces 41a, 41b are formed on the surfaces of the first and second annular flange portions 62, 72.

As retaining means for preventing disengagement of the projecting male member 73 and the cylindrical female member 63 until the disengaging operation is performed when the projecting male member 73 is inserted into the cylindrical wall 63a, an annular engagement projection 63b is formed at a free end of the cylindrical female member 63 substantially projectingly into the cylindrical wall 63a of the cylindrical female member and it comes into engagement with an annular engagement projection 73c projecting radially outwards from the outer periphery of the tip of an inserting portion 73b in the projecting male member 73.

To be more specific, the engagement projection 63b of the cylindrical female member 63 has a tapered surface 63b1 formed at the tip thereof to facilitate insertion of the inserting portion 73b of the projecting male member 73. Further, in order for the annular engagement projection 63b to be capable of expanding its diameter, two through holes 63c extending axially through the annular engagement projection 63b are formed in radially symmetric positions. On the other hand, the projecting male member 73 is provided with a base portion 73a having an outside diameter which matches the diameter of the opening 41e of the connecting sleeve 41, and the inserting portion 73b capable of being inserted into the cylindrical wall 63a of the cylindrical female member 63 is provided projectingly from a surface 73d of the base portion 73a. The inserting portion 73b is formed in a cylindrical shape so that it can reduce its diameter.

To facilitate disengagement of the retaining means comprising the annular engagement projections 73c and 63b, there is formed an operating extension 75 extending outwards from the outer periphery of the second annular flange portion 72.

According to the present invention, as will be seen from the above first and second embodiments, the cylindrical female member is inserted into the cross hole formed in the connecting sleeve and the projecting male member is inserted into the cylindrical wall of the cylindrical female member from the axially opposite side, allowing the first and second engagement projections to be engaged with each other, whereby the first and second cap portions are fastened to the connecting sleeve. Therefore, even if the fitting outside diameters of the projecting male member and the cylindrical female member are set loosely relative to the opening diameters of the cross hole in the connecting sleeve, it is possible to completely prevent dislodgment of the protecting cap from the connecting sleeve, and the function of the protecting cap to protect the annular parallel sealing surfaces is sure to be fulfilled.

Thus, in the protecting cap of the present invention, the fitting outside diameters of the projecting male member and cylindrical female member to be fitted with the opening diameters of the cross hole in the connecting sleeve need not completely match the cross hole opening diameters. The protecting cap of the invention is also applicable to Banjo members having connecting sleeves of somewhat different cross hole opening diameters. Thus, it has become possible to use the protecting cap in common to a variety of Banjo members.

Preferably, in the case the first retaining portion formed on either the outer peripheral portion of the projecting male member or the inner peripheral surface of the cylindrical wall of the cylindrical female member is brought into engagement with the second retaining portion formed on the other, one of the first and second retaining portions can be provided in plural steps axially spacedly and the other retaining portion can be brought into engagement with one of the plural retaining portions. Thus, a single protecting cap is applicable to a variety of Banjo members which are somewhat different in opening diameters of the connecting sleeve or in the thickness between a pair of parallel sealing surfaces. Consequently, the storage and management of the protecting cap become less troublesome and the protecting cap replacing work is easy, thus leading to reduction of the total cost required for the protecting cap.

The present invention is applicable equally to both the case where a hose is connected to a Banjo type joint and the case where a hose is not connected thereto.

We claim:

1. A protecting cap for a Banjo member used in a Banjo type joint, in which said Banjo type joint comprises a Banjo member fixed to one end of a cylindrical joint member, said Banjo member having a connecting sleeve as a body thereof, said connecting sleeve having a pair of first and second annular parallel sealing surfaces extending in parallel with an axis of said cylindrical joint member and also having a cross hole perpendicular to said cylindrical joint member; and said protecting cap is an integrally molded product obtained from a resin material and extending from one end to an opposite end substantially in the same plane, said protecting cap comprising:

a first cap portion having a first annular flange portion formed at said one end and a cylindrical female member, said cylindrical female member having a cylindrical wall projecting from an inner peripheral portion of said first annular flange portion coaxially with the first annular flange portion;

a second cap portion having a second annular flange portion formed at said opposite end and a projecting male member projecting from an inner peripheral portion of said second annular flange portion in substantially parallel with the same direction as the projecting direction of said cylindrical female member coaxially with the second annular flange portion;

a connecting portion for connecting said one end and said opposite end with each other, said connecting portion extending between said first annular flange portion and said second annular flange portion which is disposed substantially in the same plane as said first annular flange portion; and deforming means provided in said connecting portion for positioning said first and second cap portions in an opposed relation to each other, wherein, when said first and second cap portions are positioned oppositely to each other by said deforming means provided in said connecting portion, said first annular flange portion can come into surface contact with said first parallel sealing surface, said cylindrical female member can be inserted from said first parallel sealing surface into said cross hole, said second annular flange portion can come into surface contact with said second parallel sealing surface, and said projecting male member can be inserted from said second parallel sealing surface side into both said cross hole and said cylindrical wall of the cylindrical female member; and said protecting cap is further provided with retaining means which, when said projecting male member is inserted into said cylindrical wall of said cylindrical female member, prevents disengagement of the projecting male member and the cylindrical female member until a disengaging operation is performed.

2. A protecting cap according to claim 1, wherein said deforming means is constituted by a hinge means.

3. A protecting cap according to claim 2, wherein said hinge means is constituted by a thin-walled portion.

4. A protecting cap according to claim 1, wherein said deforming means provided in said connecting portion is constituted by a thin-walled portion.

5. A protecting cap according to claim 4, wherein said connecting portion is formed in the shape of a plate, and said thin-walled portion is formed with a plurality of grooves extending across said plate-shaped connecting portion.

6. A protecting cap according to claim 1, wherein said connecting portion has a central part, a first connecting part extending between said central part and said first annular flange portion, and a second connecting part extending between said central part and said second annular flange portion.

7. A protecting cap according to claim 6, wherein said central part is formed as a C-shaped clip.

8. A protecting cap according to claim 6, wherein a central line of said first connecting part and a central line of said second connecting part both extending in parallel with a central line of said protecting cap connecting a center of said first annular flange portion and a center of said second annular flange portion are spaced from said central line of the protecting cap.

9. A protecting cap according to claim 6, wherein said first connecting part and said second connecting part are formed at parts substantially deformable.

10. A protecting cap according to claim 1, wherein said retaining means comprises a first retaining portion formed on an inner peripheral surface of said cylindrical wall of said cylindrical female member and a second retaining portion formed on a free end of said projecting male member and adapted to engage said first retaining portion.

11. A protecting cap according to claim 10, wherein one of said first and second retaining portions is provided substantially in plural steps axially spacedly.

12. A protecting cap according to claim 10, wherein said first retaining portion is formed on either an outer peripheral surface of said projecting male member or an inner peripheral surface of said cylindrical wall of said cylindrical female member, and a plurality of said second retaining portions disengageably are formed on the other spaced in an extending direction of said cross hole.

13. A protecting cap according to claim 1, wherein said retaining means comprises a retaining engagement projection formed on either a free end of said projecting male member or an inner peripheral surface of said cylindrical wall of said cylindrical female member and a retaining engagement groove or recess formed on the other and adapted to engage relatively tightly said retaining engagement projection disengageably.

14. A protecting cap according to claim 1, wherein said retaining means comprises a first retaining engagement projection formed on either an end portion of said projecting male member or an inner peripheral surface of said cylindrical wall of said cylindrical female member and a second retaining engagement projection formed on the other and adapted to engage relatively tightly said first retaining engagement projection disengageably.

15. A protecting cap according to claim 1, wherein said connecting portion is formed substantially as a thin-walled portion.

16. A protecting cap according to claim 1, further including an operating extension extending outwards from an outer periphery of said first annular flange portion and/or said second annular flange portion.

* * * * *